A. T. HINCKLEY.
ELECTRIC FURNACE CARBON ELECTRODE.
APPLICATION FILED FEB. 2, 1912.
1,058,057.
Patented Apr. 8, 1913.
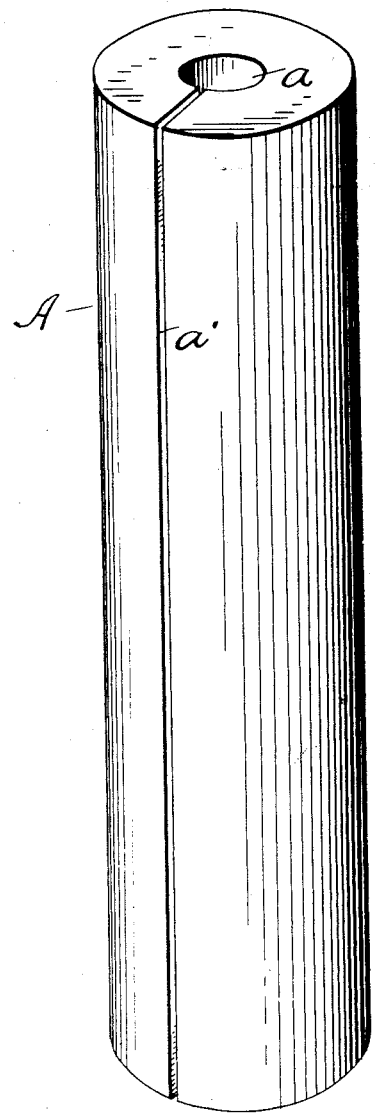
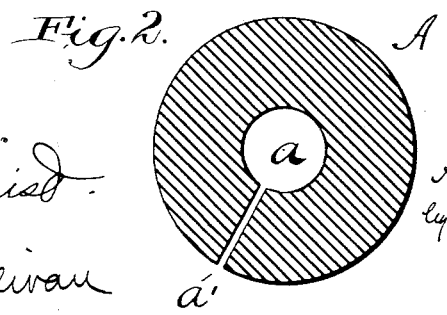

UNITED STATES PATENT OFFICE.

ARTHUR T. HINCKLEY, OF NIAGARA FALLS, NEW YORK, ASSIGNOR TO NATIONAL CARBON COMPANY, OF CLEVELAND, OHIO, A CORPORATION OF NEW JERSEY.

ELECTRIC-FURNACE CARBON ELECTRODE.

1,058,057. Specification of Letters Patent. Patented Apr. 8, 1913.

Application filed February 2, 1912. Serial No. 674,936.

*To all whom it may concern:*

Be it known that I, ARTHUR T. HINCKLEY, a citizen of the United States, residing at Niagara Falls, in the county of Niagara and State of New York, have invented a certain new and useful Improvement in Electric-Furnace Carbon Electrodes, of which the following is a full, clear, and exact description.

The object of this invention is to increase the durability of carbon electrodes, especially of the larger sizes, when used in electric furnaces; and particularly to reduce the chances that such carbon electrodes will break or shale as the result of differences in temperature of the outer and inner parts of said electrodes, which result from putting them into or taking them from electric furnaces.

When a large carbon electrode of the ordinary construction is put into an electric furnace at high temperature, the electrode will become intensely hot on the outside, while the center thereof is still comparatively cool. This is owing to the fact that the heat conductivity of carbon is relatively low. It may well happen that a carbon electrode, of say 14 inches diameter, may be so heated that its center will be at a temperature of 500° only, while the outer surface may have a temperature of say 1000°. The disruptive force caused by these temperature differences is very great, and much breakage of electrodes results therefrom, as will be readily understood if one considers that the coefficient of tensile elasticity of such carbon electrodes is only about one-tenth that of steel.

In practice, it is necessary, or, at least, it is common to put a cold carbon electrode into a very hot electric furnace. Very frequently the result of so doing is the disruption of the electrode. When the electrodes do not break, they frequently shale, which is exceedingly objectionable and troublesome.

The electrode shown in the drawing and hereinafter described and claimed is of such construction that the above mentioned undesirable action occurs rarely when the electrodes are put into or used in electric furnace work. Said electrode is tubular and has a narrow longitudinal slit extending from the outer surface to the central hole, and extending from end to end.

In the drawing, Figure 1 is a perspective view of a carbon electrode embodying this invention; and Fig. 2 is an end view thereof.

Referring to the parts by letters, A represents a tubular electrode; that is to say, an electrode having a longitudinal hole $a$ running through it from end to end. Additionally, a narrow slit $a'$ is formed from the hole to the outer surface, which slit is extended from end to end of said electrode. Such electrodes may be made of any suitable carbon or carbonaceous mix,—and may be compressed and formed in any manner before baking; and may have any desired external configuration.

It is evident that, in an electrode A having a hole $a$ running through it lengthwise in the center, the distance through which the disruptive force of temperature differences will act is reduced from the radius of the electrode to one-half the thickness of the annular wall; because, by convection, the exposed surface of the wall of the hole reaches furnace temperature substantially as soon as the external surface. There will, of course, be some unequal expansion which might cause breakage even with a tubular carbon, but the liability that this unequal expansion shall produce the injurious results referred to is practically eliminated by the longitudinal slit referred to. If this slit in a 16 inch carbon is one-quarter of an inch wide it will serve its purpose admirably.

Having described my invention, I claim:

A carbon electrode for electric furnace work having a hole formed through it longitudinally from end to end, and having through its wall a narrow slit which also extends from end to end.

In testimony whereof, I hereunto affix my signature in the presence of two witnesses.

ARTHUR T. HINCKLEY.

Witnesses:
H. R. SULLIVAN,
E. L. THURSTON.